US009996319B2

(12) United States Patent
Anderson et al.

(10) Patent No.: US 9,996,319 B2
(45) Date of Patent: Jun. 12, 2018

(54) FLOATING POINT (FP) ADD LOW INSTRUCTIONS FUNCTIONAL UNIT

(71) Applicant: Intel Corporation, Santa Clara, CA (US)

(72) Inventors: Cristina S. Anderson, Hillsboro, OR (US); Marius A. Cornea-Hasegan, Hillsboro, OR (US); Elmoustapha Ould-Ahmed-Vall, Chandler, AZ (US); Robert Valentine, Kiryat Tivon (IL); Jesus Corbal, Barcelona (ES); Nikita Astafev, Portland, OR (US); Mark J. Charney, Lexington, MA (US); Milind B. Girkar, Sunnyvale, CA (US); Amit Gradstein, Binyamina (IL); Simon Rubanovich, Haifa (IL); Zeev Sperber, Zichron Yackov (IL)

(73) Assignee: Intel Corporation, Santa Clara, CA (US)

(*) Notice: Subject to any disclaimer, the term of this patent is extended or adjusted under 35 U.S.C. 154(b) by 91 days.

(21) Appl. No.: 14/998,366

(22) Filed: Dec. 23, 2015

(65) Prior Publication Data
US 2017/0185377 A1 Jun. 29, 2017

(51) Int. Cl.
G06F 7/48 (2006.01)
G06F 7/485 (2006.01)

(52) U.S. Cl.
CPC .................... G06F 7/485 (2013.01)

(58) Field of Classification Search
None
See application file for complete search history.

(56) References Cited

U.S. PATENT DOCUMENTS

| 4,922,446 | A |   | 5/1990 | Zurawski et al. |   |
|---|---|---|---|---|---|
| 4,975,868 | A | * | 12/1990 | Freerksen | G06F 7/4876 708/503 |
| 5,027,308 | A | * | 6/1991 | Sit | G06F 7/485 708/205 |
| 5,122,981 | A | * | 6/1992 | Taniguchi | G06F 7/483 708/497 |
| 5,341,321 | A | * | 8/1994 | Karp | G06F 7/5525 708/500 |
| 2003/0055859 | A1 |   | 3/2003 | Seidel et al. |   |

(Continued)

OTHER PUBLICATIONS

International Search Report and Written Opinion for International Patent Application No. PCT/US2016/063634, 13 pages, dated Mar. 6, 2017.

Primary Examiner — Michael D. Yaary
(74) Attorney, Agent, or Firm — Lowenstein Sandler LLP

(57) ABSTRACT

An example processor includes a register and an ADD low functional unit. The register stores first, second, and third floating point (FP) values. The ADD low functional unit receives a request to perform an ADD low operation and, responsive to the request: adds the first FP value with the second FP value to obtain a first sum value; rounds the first sum value to generate an ADD value; adds the first FP value with the second FP value to obtain a second sum value; subtracts the ADD value from the second sum value to generate a difference value; normalizes the difference value to obtain a normalized difference value; rounds the normalized difference value to generate an ADD low value; and sends the ADD low value to an application.

20 Claims, 10 Drawing Sheets

(56) References Cited

U.S. PATENT DOCUMENTS

2006/0136543 A1 6/2006 Lutz et al.
2013/0007084 A1 1/2013 Nystad
2015/0067010 A1 3/2015 Czajkowski

* cited by examiner

FLOATING POINT (FP) ADD LOW INSTRUCTIONS FUNCTIONAL UNIT

BACKGROUND

Power conservation and processing efficiency is increasingly becoming a focus for electronic devices. To reduce power consumption and increase efficiency, processors can use floating point operations for various processes and applications. Processors can have one or more functional units that execute instructions with floating point operations. The functional units can be hardware units, such as floating-point units (FPUs) or a math coprocessor, which consume a relatively large amount of power at the processor. More efficient FPUs and math coprocessors can decrease the power consumption and increase an efficiency of the processor.

BRIEF DESCRIPTION OF THE DRAWINGS

Various embodiments of the present invention will be understood more fully from the detailed description given below and from the accompanying drawings of various embodiments of the invention.

DESCRIPTION OF EMBODIMENTS

Figure 1A:
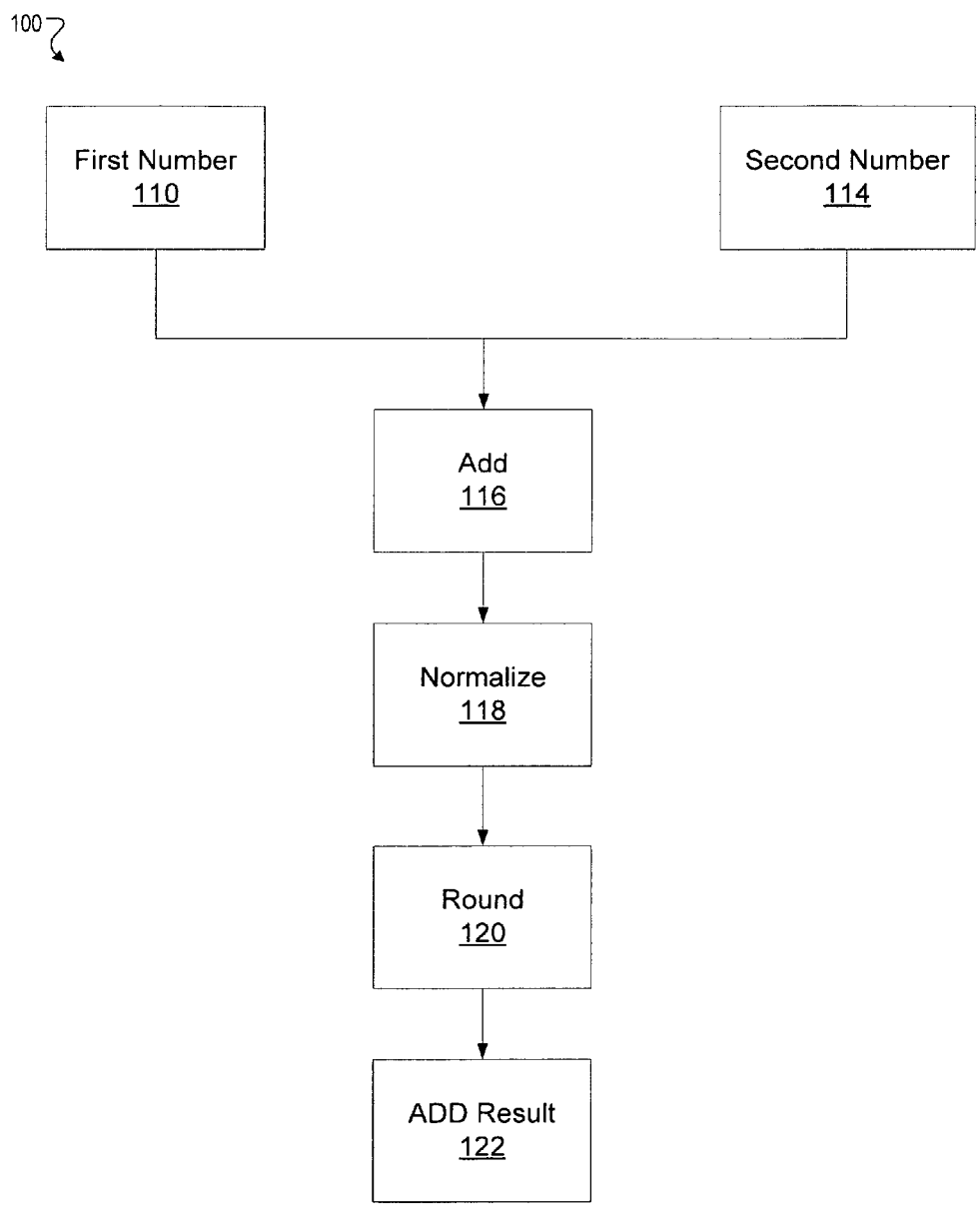
FIG. 1A illustrates a diagram of a method for performing an ADD operation according to one embodiment.

Conventional central processing units (CPUs) and graphical processing units (GPUs) designs include a FPU or a math coprocessor. The FPU can perform mathematical operations on floating-point numbers. For example, a multiply-adder circuit within a FPU can execute a fused add operation to perform a single instruction execution of the equation $(a \times b)+c$. The FPU or the math coprocessor can be specialized hardware, such as an arithmetic-logic unit (ALU), which is part of a computer processor (CPU) or a graphical processing unit (GPU) to perform certain floating-point functions. The CPUs and GPUs can use the FPU or the math coprocessor for applications ranging from multimedia processing and 3D graphics processing to scientific and engineering applications. Conventional CPUs and GPUs can incorporate integrated multiply-accumulation operations, such as fused add operations. The fused add operations can have a lower latency and a higher precision than a multiplication followed by an addition.

To improve floating-point arithmetic processing, conventional processors use floating point add (ADD) operations to for execution of an ADD instruction, e.g., a+b. Conventional ADD operations can employ hardware with single and double precision (e.g., native floating-point precision) for addition operation. For example, many conventional electronic devices have CPUs or GPUs that implement IEEE® double-precision arithmetic standards in hardware, providing correctly rounded results for the basic operations of addition, subtraction, multiplication and division. These conventional electronic devices use double-precision floating point representations to maintain a performance level of the electronic device. However, the native floating-point precision can be inadequate for certain applications.

In another example, a dot product operation can execute a long series of floating-point computations. When the dot product operation uses native floating-point precision, an insufficient precision of the native floating-point precision produces a mismatch in rounding between the result of a long series of floating-point computations and a mathematical result (i.e., infinitely precise). The native floating-point precision is insufficient for applications such as scientific applications that require a higher degree of precision for calculations, linear algebra functions, complex arithmetic functions, certain math library functions, and applications using long sums or dot products that require multi-precision.

When native floating-point precision is insufficient, multi-precision computation can be used to meet proper accuracy requirements. Conventional ADDs use software emulation to perform multi-precision operations or extended precision operations to meet the increase accuracy requirements. However, software emulation of an ADD operation can take several floating point operations to perform. For example, to perform an ADD operation on a low part or tail of an ADD operation can take a software emulation of the ADD operation between 3 floating point (FP) operations when an order of |a|, |b| is known and 5 FP operations when an order of |a|, |b| is unknown, e.g., a general case implementation. Additionally, the 3 to 5 FP operations to perform the software emulation do not include checks for special cases, such as Infinity/NaN inputs or overflow, which can further decrease a performance of the ADD operation software emulation. The 3 to 5 FP operations for the software emulation also do not include range checks, which can further decrease a performance of the ADD operation software emulation.

The embodiments described herein may address the above noted deficiencies by using hardware operation units to compute a low part or tail (ADD low) of an ADD. In one example, a result of a full ADD operation is a sum of a high FP value, a low FP value, and a lowest FP value, e.g., high FP+low FP+lowest FP. The ADD low operation generates a result using is the low FP value. An advantage of the ADD low operation is that the ADD low operation maintains a similar accuracy level as ADD hardware computing the full ADD result while increasing an efficiency and performance of the ADD hardware. For example, The ADD low operation can have an exact ADD low result (no rounding error) when ADD(a,b) is rounded to nearest integer. For example, the ADD low operation can increase the efficiency and performance of the ADD hardware by decreasing a number of FP operations used to compute the result. For example, conventionally a double-double addition of (a_high+a_low)+(b_high+b_low), where a, b, c, and d can be variables, is computed as a high FP+low FP. In one example, the conventional double-double addition operation using an ADD algorithm can take 7 FP operations, a branch, and 3 logical operations with a latency of 1 FP operation, a branch, and 3 logical operations while the double-double addition operation computed using a ADD low algorithm can take 4 FP operations with a latency of 3 FP operations. In another example, a conventional extended accuracy summation operation (Kahan summation operation) can take 4 FP operations with a latency of 4 ADDs while an extended accuracy summation operation using the ADD low algorithm can take 2 FP operations with a latency of 1 ADD and 1 ADD low.

FIG. 1A illustrates a diagram of a method 100 for performing an ADD operation according to one embodiment. The method 100 may be at least partially performed by a logic unit or an ALU of a processing device or processing logic that may include hardware (e.g., circuitry, dedicated logic, programmable logic, microcode, etc.), software (e.g., instructions executed by a processing device), firmware or a combination thereof.

Referring to FIG. 1A, the method 100 begins with adding a first number 110 with a second number 112 using an adder to obtain a sum value (116). In one embodiment, the first number 110 and the second number 112 may be floating point numbers that may be represented in a binary format.

In another embodiment, the first number 110 can include a first mantissa and a first exponent and the second number 112 can include a second mantissa and a second exponent. The exponents can be a part of the floating-point number representation (encoding), which includes a sign, an exponent, and a mantissa field. The floating-point values can, therefore, be equal to $\{(-1)^{sign}*2^{exponent-bias}*mantissa\}$ in an embodiment. In one embodiment, when the first number 110 is added with the second number 112, the first mantissa is added with the second mantissa to generate the sum value.

In another embodiment, a shifter may shift the bits of the first mantissa and the second mantissa to the left or to the right. The shifter may shift the bits of the first mantissa and the second mantissa so that the bits of the first mantissa and the second mantissa are properly aligned for addition operations or subtraction operations.

The method can include normalizing the sum value using a normalizer to generate a normalized sum value (118). In one embodiment, the normalizing (118) may include encoding the sum value using an encoder. The encoding can include the encoder analyzing a bit string of the sum value. The encoder can determine whether bits in the bit string are to be shifted. For example, the encoder may analyze a bit string and identify a position of the leftmost (e.g., most significant) "0" bit. If the left most "0" bit is five bits from the left of the bit number, the encoder may determine that the bit string is to be shifted left by five positions. In another embodiment, the normalizing (118) can include shifting a bit string right or left using a shifter. The shifter may add "0" values to the right of the bit string if the bit string is shifted left and may add "0" values to the left of the bit string if the bit string is shifted right.

In one example, the result (before normalizing) includes a 1 ("one") in the leading mantissa bit. The position of the leading bit can be fixed and be dependent on the implementation. When there are any non-zero result bits above the leading bit position, the normalizing can include shifting the result right one bit at a time, until the leading bit is 1 ("one") and all bit positions above it are zero. The exponent can also be incremented with each shift right. Otherwise, when the leading bit is 0 ("zero") but there are non-zero bits in lower positions, the result mantissa can be shifted left one bit at a time, until the leading bit is one ("1"). Similarly, the result exponent can be incremented for each shift-left.

The method can further include rounding the normalized sum value using a rounder to generate a rounded normalized sum value (120). The method can further include generating the ADD result using the rounded normalized sum value (122). In one embodiment, the ADD result value is a computation of ADD(a,b)=a+b, where a is the first number 110 and b is the second number 112, and a+b is rounded. The adder, normalizer, and rounder can be logical units or ALUs.

Figure 1B:
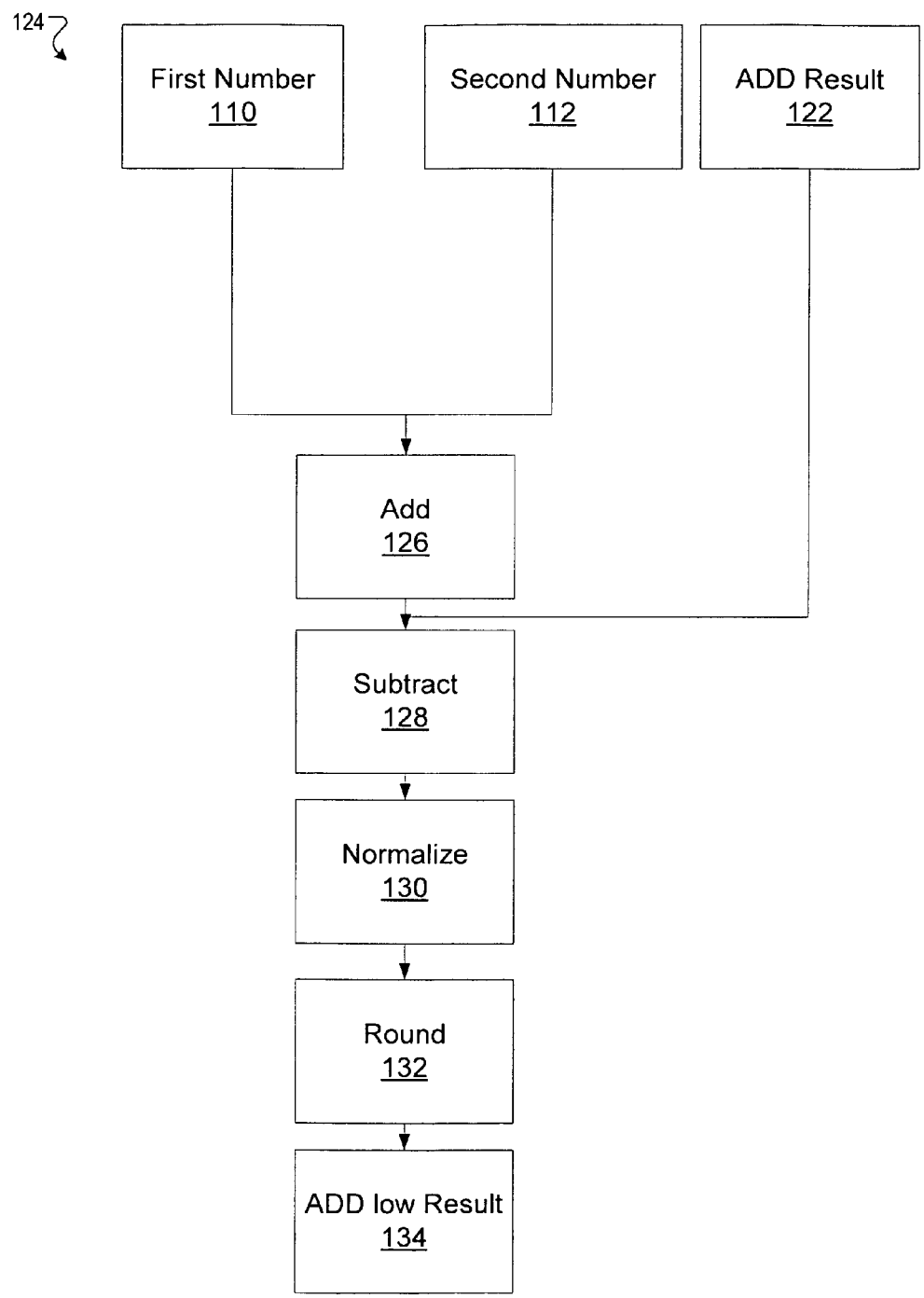
FIG. 1B illustrates a diagram of a method of performing an ADD low operation according to one embodiment.

FIG. 1B illustrates a diagram of a method 124 of performing an ADD low operation according to one embodiment. The method 124 may be at least partially performed by a logic unit or an ALU of a processing device or processing logic that may include hardware (e.g., circuitry, dedicated logic, programmable logic, microcode, etc.), software (e.g., instructions executed by a processing device), firmware or a combination thereof.

Referring to FIG. 1B, the method 124 begins with adding, using an adder, the first number 110 with the second number 112 to obtain a sum value (126). Some numbers and results of the method 124 of FIG. 1B are similar to some numbers and results of method 100 of FIG. 1A as noted by similar reference numbers unless expressly described otherwise. The method can include subtracting the ADD result 122 from the sum value using a subtractor to generate a difference value (128). The method can include normalizing the difference value using a normalizer to generate a normalized difference value (130). In one embodiment, the normalizing (130) may include encoding the difference value using an encoder. The encoding can include an encoder analyzing a bit string of the difference value. The encoder can determine whether the bits in the bit string should be shifted. In another embodiment, the normalizing (130) can include shifting a bit string right or left using a shifter. The method can include rounding the normalized difference value using a rounder to generate a rounded normalized difference value (132). The method can include generating the ADD low result value using the rounded normalized difference value, which in one embodiment, can include using one or more bits discarded during rounding in bock 132 (134). The adder, subtractor, normalizer, and rounder can be logical units or ALUs.

Figure 2:
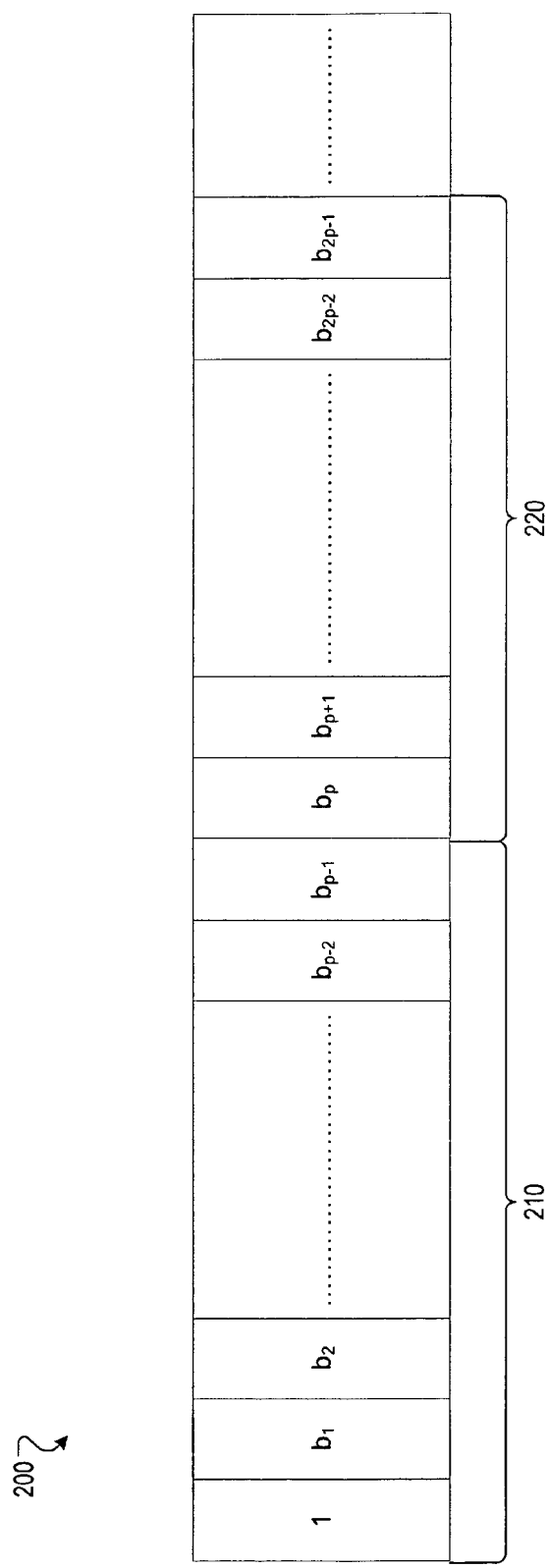
FIG. 2 illustrates a diagram of a bit string for an ADD low operation according to one embodiment.

FIG. 2 illustrates a diagram of a bit string 200 for the ADD low operation of FIG. 1B according to one embodiment. The ADD low operation of FIG. 1B can generate an ADD low result using the following algorithm of ADD low(a,b)=round ((a+b)−ADD(a,b)). The bit string 200 can include a first mantissa 210 and a second mantissa 220.

In one embodiment, the first mantissa 210 is the ADD result value of the ADD operation in method 100 (FIG. 1A). The first mantissa 210 can be a normalized mantissa for the ADD result 122. The first mantissa 210 can include multiple bits including b, b1, b2, ..., bp−2, bp−1, where b represents a location of the bit in the bit string 200. P indicates a bit format of the first mantissa 210 or the second mantissa 220. For example, when P is equal to 24, the bit format is a single precision format. In another example, when P is equal to 53, the bit format is a double precision format.

In another embodiment, the second mantissa 220 is the ADD low result value of the ADD low operation in method 124 (FIG. 1B). The second mantissa 220 can be a normalized mantissa for the ADD low result value. The second mantissa 220 can include multiple bits bp, bp+1, . . . , b2p−1, where b represents a location of the bit in the bit string 200. In one example, assuming |a|>=|b| without a loss of generality, when exponent(a)−exponent(b)>p then ADD(a,b)=a in round-to-nearest mode and ADD_low(a,b)=b. An advantage of using the single precision format for the ADD low result value can be to reduce a number of elements computed in parallel for a single instruction, multiple data (SIMD) instruction. An advantage of the double precision format is to increase an accuracy of the ADD result 126 or the ADD low result value. For example, a double precision ADD low result value can be used for a double precision SIMD computations or a scalar computation.

In one embodiment, for the ADD result value (FIG. 1A) and/or for the ADD low result value (FIG. 1B) can be rounded, as discussed in the preceding paragraphs. In one example, a normalized ADD low result value is a pre-rounded mantissa and the ADD low result value can be rounded from $R*2^{-p+1}+b_p*2^{-p}+b_{p+1}*2^{-p-1}+ \ldots +b_{2p-1}*2^{-2p+1}+ \ldots$, where R=−1 when ADD(a,b) is rounded away from zero (towards +/−Infinity) and R=0 when ADD(a,b) is rounded towards zero. In another example, an exponent of the ADD low result value can be adjusted using normalization (such as by using shifting as discussing in the preceding paragraphs) and a proper sign can be applied.

In one embodiment, the ADD result value or the ADD low result value can be rounded because a length of the bits for the ADD result value or the ADD low result value exceed a defined length of the bit string 200. For example, the ADD low result value can be generated using the following algorithm: ADD low(a,b)=(a+b)−ADD(a,b), where a is the first number 110 and b is the second number 112 (FIGS. 1A and 1B).

In another example, when the ADD low result value exceed a defined length of the bit string 200, the ADD low result value can be generated using the following algorithm: ADD low(a,b)=round((a+b)−ADD(a,b)). In this example, ADD low(a,b)=(a+b)−ADD(a,b) is a double precision or a single precision floating point format that exceeds the defined length of the bit string 200. In another example, a double-precision format can use twice as many bits as a regular floating-point number and exceeds the defined length of the bit string 200.

In one embodiment, the ADD result value or the ADD low result value can be rounded using a round-to-nearest integer algorithm. In another embodiment, the ADD result value or the ADD low result value can be rounded using a round towards zero algorithm. In another embodiment, the ADD result value and the ADD low result value can be rounded using other rounding algorithms. In another embodiment, a number of tail bits used in computing the ADD low result value can be limited, such as limiting the tails bits to bp, bp+1, . . . , b2p−1. This can be the same as truncating the precise result to a specified number of bits (e.g., up to bit $b_{2p-1}$); in that case all lower bits (e.g., starting with $b_{2p}$) can be discarded.

Figure 3:
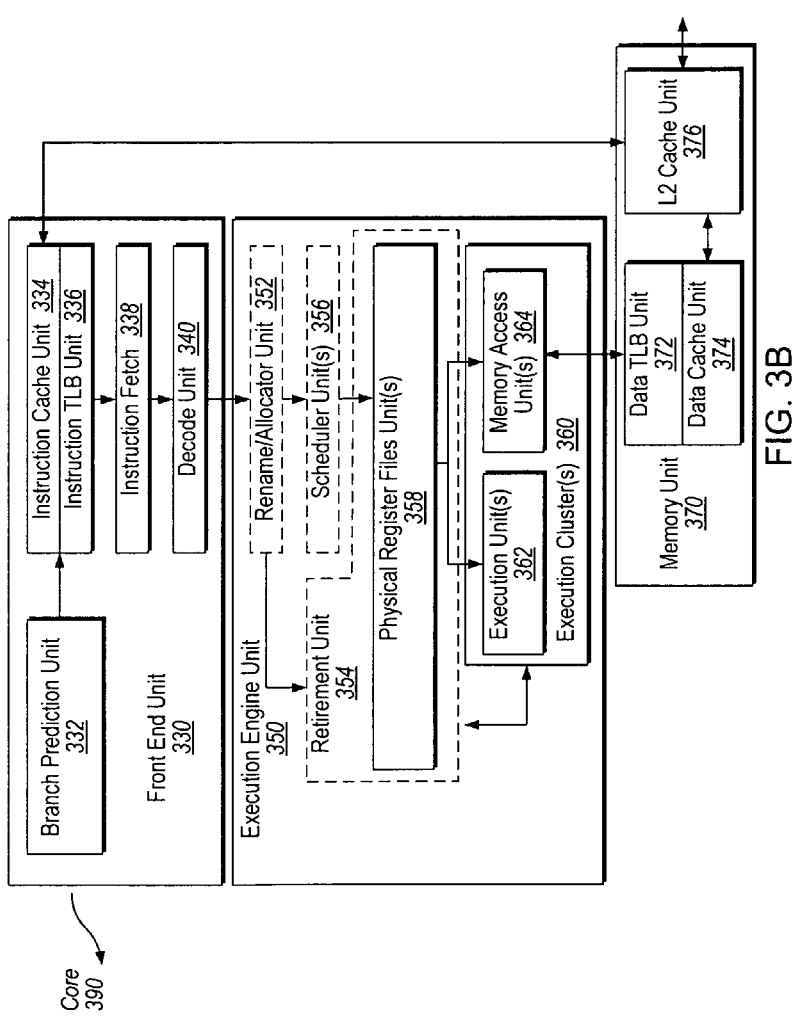
FIG. 3A is a block diagram illustrating an in-order pipeline and a register renaming stage, out-of-order issue/execution pipeline according to one embodiment.
FIG. 3B is a block diagram illustrating a micro-architecture for a processor that implements floating point (FP) add low operations according to one embodiment.

FIG. 3A is a block diagram illustrating is a block diagram illustrating an in-order pipeline and a register renaming stage, out-of-order issue/execution pipeline implemented by processor 300 according to some embodiments of the disclosure. The solid lined boxes in FIG. 3A illustrate an in-order pipeline, while the dashed lined boxes illustrates a register renaming, out-of-order issue/execution pipeline. Specifically, processor 300 depicts an in-order architecture core and a register renaming logic, out-of-order issue/execution logic to be included in a processor according to at least one embodiment of the disclosure.

In FIG. 3A, the pipeline includes a fetch stage 302, a length decode stage 304, a decode stage 306, an allocation stage 308, a renaming stage 310, a scheduling (also known as a dispatch or issue) stage 312, a register read/memory read stage 314, an execute stage 316, a write back/memory write stage 318, an exception handling stage 322, and a commit stage 324. In some embodiments, the ordering of stages 302-324 may be different than illustrated and are not limited to the specific ordering shown in FIG. 3A.

FIG. 3B is a block diagram illustrating a micro-architecture for a processor 300 that implements floating point (FP) add low operations according to one embodiment. Processor 300 includes a front end unit 330 coupled to an execution engine unit 350, and both are coupled to a memory unit 370. The processor 300 may include a reduced instruction set computing (RISC) core, a complex instruction set computing (CISC) core, a very long instruction word (VLIW) core, or a hybrid or alternative core type. As yet another option, processor 300 may include a special-purpose core, such as, for example, a network or communication core, compression engine, graphics core, or the like. In one embodiment, processor 300 may be a multi-core processor or may be part of a multi-processor system. The embodiments of the page additions and content copying can be implemented in processor 300.

The front end unit 330 includes a branch prediction unit 332 coupled to an instruction cache unit 334, which is coupled to an instruction translation lookaside buffer (TLB) 336, which is coupled to an instruction fetch unit 338, which is coupled to a decode unit 340. The decode unit 340 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 340 may be implemented using various different mechanisms. Examples of suitable mechanisms include, but are not limited to, look-up tables, hardware implementations, programmable logic arrays (PLAs), microcode read only memories (ROMs), etc. The instruction cache unit 334 is further coupled to the memory unit 370. The decode unit 340 is coupled to a rename/allocator unit 352 in the execution engine unit 350.

The execution engine unit 350 includes the rename/allocator unit 352 coupled to a retirement unit 354 and a set of one or more scheduler unit(s) 356. The scheduler unit(s) 356 represents any number of different schedulers, including reservations stations (RS), central instruction window, etc. The scheduler unit(s) 356 is coupled to the physical register file(s) unit(s) 358. Each of the physical register file(s) units 358 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 358 is overlapped by the retirement unit 354 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 354 and the physical register file(s) unit(s) 358 are coupled to the execution cluster(s) 360. The execution cluster(s) 360 includes a set of one or more execution units 362 and a set of one or more memory access units 364. The execution units 362 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 356, physical register file(s) unit(s) 358, and execution cluster(s) 360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 364). It should also be understood that where separate pipelines are used, one or more of these pipelines may be out-of-order issue/execution and the rest in-order.

The set of memory access units 364 is coupled to the memory unit 370, which may include a data prefetcher 380, a data TLB unit 372, a data cache unit (DCU) 374, and a level 2 (L2) cache unit 376, to name a few examples. In some embodiments DCU 374 is also known as a first level data cache (L1 cache). The DCU 374 may handle multiple outstanding cache misses and continue to service incoming stores and loads. It also supports maintaining cache coherency. The data TLB unit 372 is a cache used to improve virtual address translation speed by mapping virtual and physical address spaces. In one exemplary embodiment, the memory access units 364 may include a load unit, a store address unit, and a store data unit, each of which is coupled to the data TLB unit 372 in the memory unit 370. The L2 cache unit 376 may be coupled to one or more other levels of cache and eventually to a main memory.

In one embodiment, the data prefetcher 380 speculatively loads/prefetches data to the DCU 374 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 300 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4:
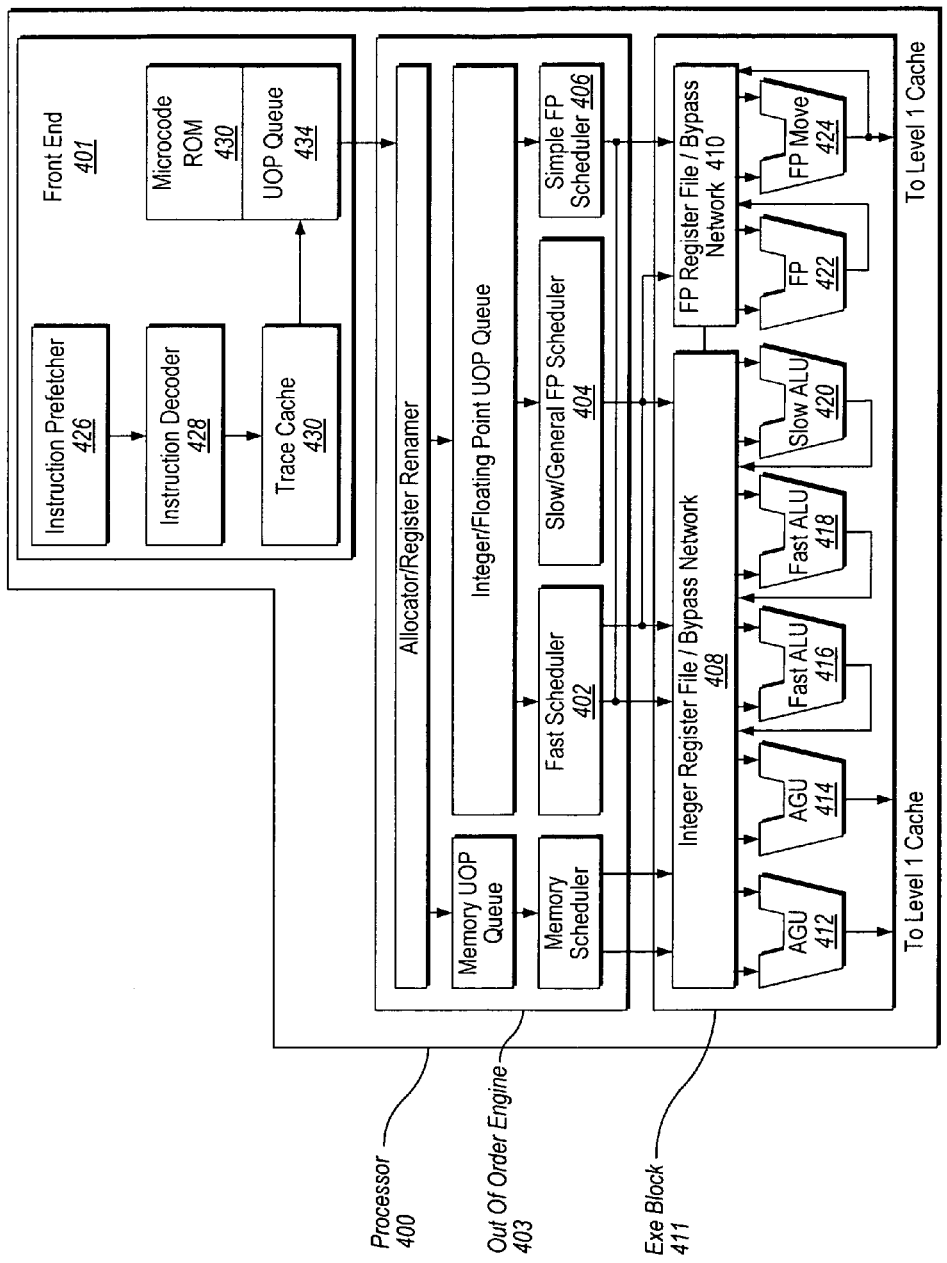
FIG. 4 illustrates a block diagram of the micro-architecture for a processor that includes logic circuits to perform FP add low operations according to one embodiment.

FIG. 4 illustrates a block diagram of the micro-architecture for a processor 400 that includes logic circuits to perform floating point (FP) add low operations according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 401 is the part of the processor 400 that fetches instructions to be executed and prepares them to be used later in the processor pipeline. The embodiments of the page additions and content copying can be implemented in processor 400.

The front end 401 may include several units. In one embodiment, the instruction prefetcher 416 fetches instructions from memory and feeds them to an instruction decoder 418 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 430 takes decoded uops and assembles them into program ordered sequences or traces in the uop queue 434 for execution. When the trace cache 430 encounters a complex instruction, the microcode ROM 432 provides the uops needed to complete the operation.

Some instructions are converted into a single micro-op, whereas others need several micro-ops to complete the full operation. In one embodiment, if more than four micro-ops are needed to complete an instruction, the decoder 418 accesses the microcode ROM 432 to do the instruction. For one embodiment, an instruction can be decoded into a small number of micro ops for processing at the instruction decoder 418. In another embodiment, an instruction can be stored within the microcode ROM 432 should a number of micro-ops be needed to accomplish the operation. The trace cache 430 refers to an entry point programmable logic array (PLA) to determine a correct micro-instruction pointer for reading the micro-code sequences to complete one or more instructions in accordance with one embodiment from the micro-code ROM 432. After the microcode ROM 432 finishes sequencing micro-ops for an instruction, the front end 401 of the machine resumes fetching micro-ops from the trace cache 430.

The out-of-order execution engine 403 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 402, slow/general floating point scheduler 404, and simple floating point scheduler 406. The uop schedulers 402, 404, 406, determine when a uop is ready to execute based on the readiness of their dependent input register operand sources and the availability of the execution resources the uops need to complete their operation. The fast scheduler 402 of one embodiment can schedule on each half of the main clock cycle while the other schedulers can only schedule once per main processor clock cycle. The schedulers arbitrate for the dispatch ports to schedule uops for execution.

Register files 408, 410, sit between the schedulers 402, 404, 406, and the execution units 412, 414, 416, 418, 420, 422, 424 in the execution block 411. There is a separate register file 408, 410, for integer and floating point operations, respectively. Each register file 408, 410, of one embodiment also includes a bypass network that can bypass or forward just completed results that have not yet been written into the register file to new dependent uops. The integer register file 408 and the floating point register file 410 are also capable of communicating data with the other. For one embodiment, the integer register file 408 is split into two separate register files, one register file for the low order 32 bits of data and a second register file for the high order 32 bits of data. The floating point register file 410 of one embodiment has 128 bit wide entries because floating point instructions typically have operands from 64 to 128 bits in width.

The execution block 411 contains the execution units 412, 414, 416, 418, 420, 422, 424, where the instructions are actually executed. This section includes the register files 408, 410, that store the integer and floating point data operand values that the micro-instructions need to execute. The processor 400 of one embodiment is comprised of a number of execution units: address generation unit (AGU) 412, AGU 414, fast ALU 416, fast ALU 418, slow ALU 420, floating point ALU 422, floating point move unit 424. For one embodiment, the floating point execution blocks 412, 414, execute floating point, MMX, SIMD, and SSE, or other operations. The floating point ALU 412 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 416, 418. The fast ALUs 416, 418, of one embodiment can execute fast operations with an effective latency of half a clock cycle. For one embodiment, most complex integer operations go to the slow ALU 410 as the slow ALU 410 includes integer execution hardware for long latency type of operations, such as a multiplier, shifts, flag logic, and branch processing. Memory load/store operations are executed by the AGUs 412, 414. For one embodiment, the integer ALUs 416, 418, 420, are described in the context of performing integer operations on 64 bit data operands. In alternative embodiments, the ALUs 416, 418, 420, can be implemented to support a variety of data bits including 16, 32, 128, 256, etc. Similarly, the floating point units 412, 414, can be implemented to support a range of operands having bits of various widths. For one embodiment, the floating point units 412, 414, can operate on 128 bits wide packed data operands in conjunction with SIMD and multimedia instructions.

In one embodiment, the uops schedulers 402, 404, 406, dispatch dependent operations before the parent load has finished executing. As uops are speculatively scheduled and executed in processor 400, the processor 400 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 400 also includes logic to implement floating point (FP) add low operations according to one embodiment. In one embodiment, the execution block 411 of processor 400 may include a microcontroller (MCU), to perform FP add low operations according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "S SEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 5:
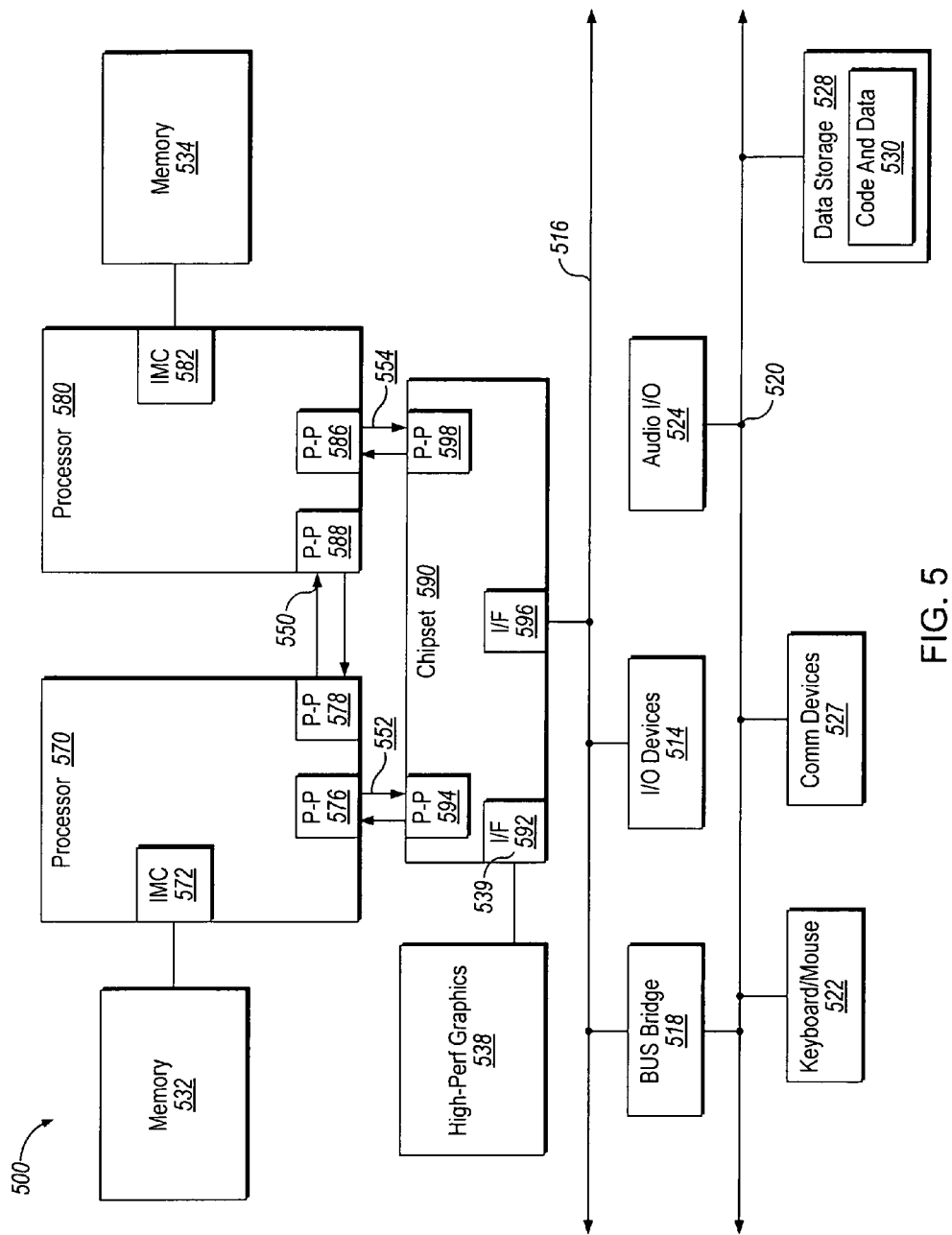
FIG. 5 is a block diagram of a computer system according to one implementation.

Embodiments may be implemented in many different system types. Referring now to FIG. 5, shown is a block diagram of a multiprocessor system 500 in accordance with an implementation. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b), although potentially many more cores may be present in the processors. The processors each may include hybrid write mode logics in accordance with an embodiment of the present. The embodiments of the page additions and content copying can be implemented in the processor 570, processor 580, or both.

While shown with two processors 570, 580, it is to be understood that the scope of the present disclosure is not so limited. In other implementations, one or more additional processors may be present in a given processor.

Processors 570 and 580 are shown including integrated memory controller units 572 and 582, respectively. Processor 570 also includes as part of its bus controller units point-to-point (P-P) interfaces 576 and 588; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may also exchange information with a high-performance graphics circuit 538 via a high-performance graphics interface 539.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present disclosure is not so limited.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to second bus 520. Note that other architectures are possible. For example, instead of the point-to-point architecture of FIG. 5, a system may implement a multi-drop bus or other such architecture.

Figure 6:
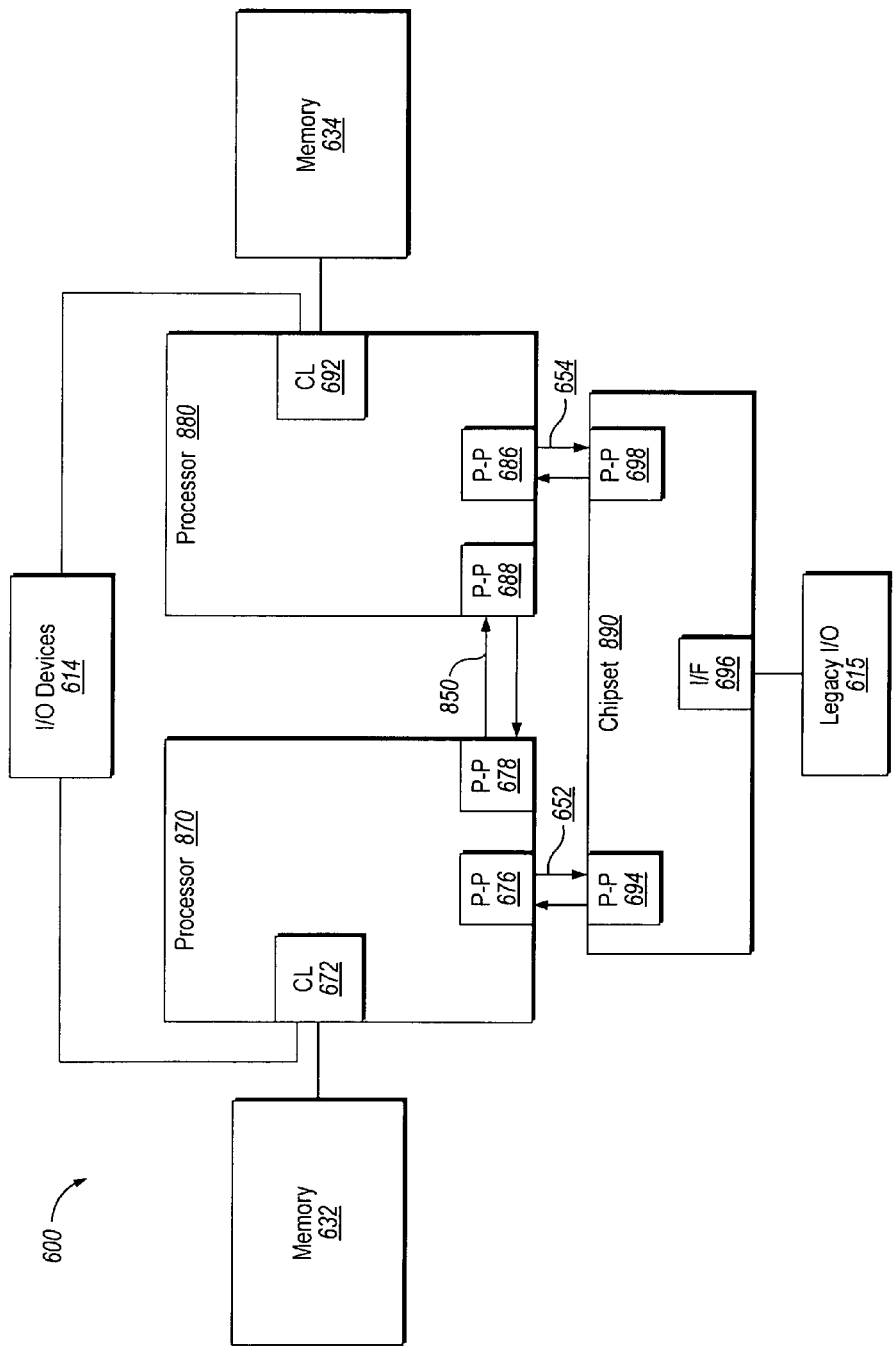
FIG. 6 is a block diagram of a computer system according to another implementation.

Referring now to FIG. 6, shown is a block diagram of a third system 600 in accordance with an embodiment of the present invention. Like elements in FIGS. 5 and 6 bear like reference numerals, and certain aspects of FIG. 5 have been omitted from FIG. 5 in order to avoid obscuring other aspects of FIG. 6.

FIG. 6 illustrates that the processors 670, 680 may include integrated memory and I/O control logic ("CL") 672 and 682, respectively. For at least one embodiment, the CL 672, 682 may include integrated memory controller units such as described herein. In addition. CL 672, 682 may also include I/O control logic. FIG. 6 illustrates that the memories 632, 634 are coupled to the CL 672, 682, and that I/O devices 614 are also coupled to the control logic 672, 682. Legacy I/O devices 615 are coupled to the chipset 690. The embodiments of the page additions and content copying can be implemented in processor 670, processor 680, or both.

Figure 7:
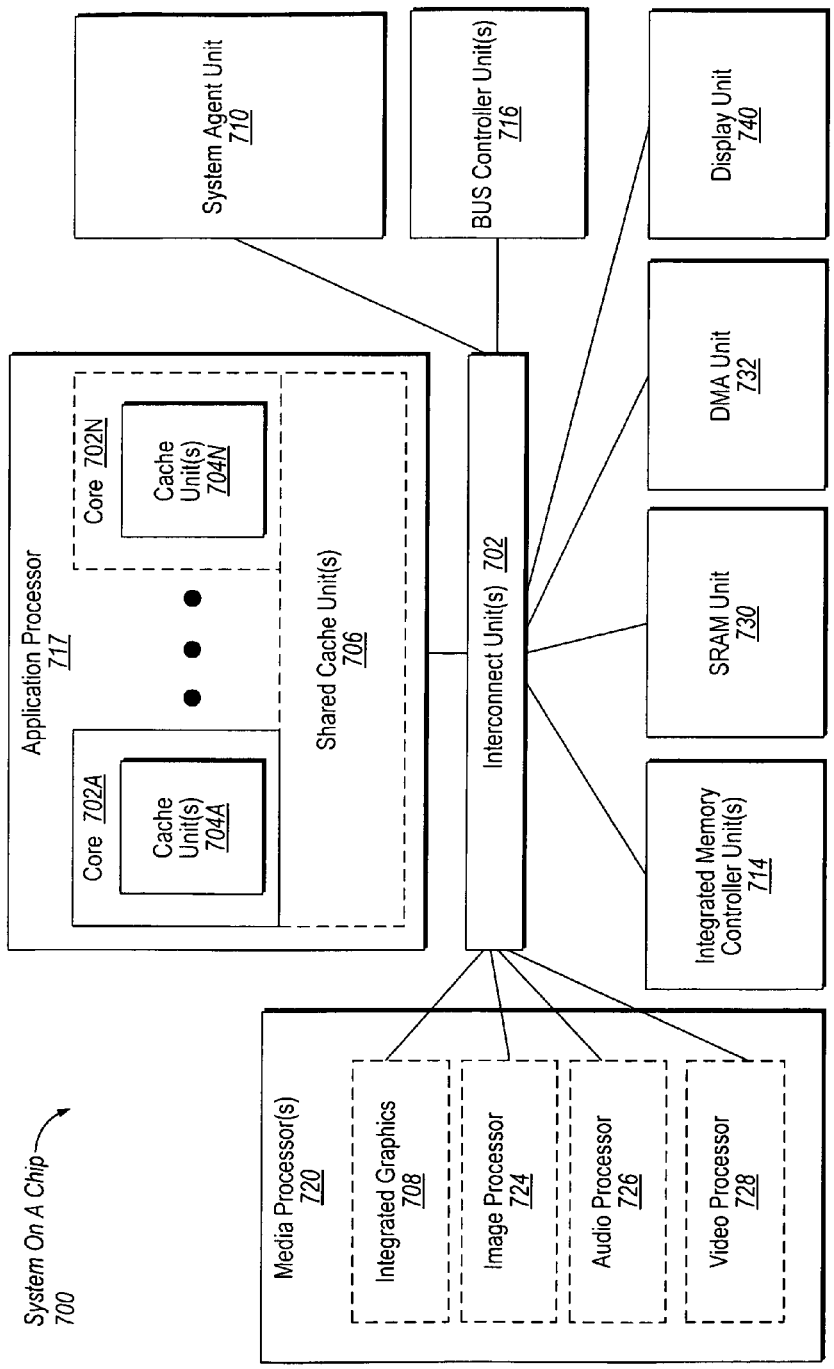
FIG. 7 is a block diagram of a system-on-a-chip according to one implementation.

FIG. 7 is an exemplary system on a chip (SoC) 700 that may include one or more of the cores 702. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 7 is a block diagram of a SoC 700 in accordance with an embodiment of the present disclosure. Dashed lined boxes are features on more advanced SoCs. In FIG. 7 an interconnect unit(s) 702 is coupled to: an application processor 717 which includes a set of one or more cores 702A-N and shared cache unit(s) 706; a system agent unit 710; a bus controller unit(s) 716; an integrated memory controller unit(s) 714; a set or one or more media processors 720 which may include integrated graphics logic 708, an image processor 724 for providing still and/or video camera functionality, an audio processor 726 for providing hardware audio acceleration, and a video processor 728 for providing video encode/decode acceleration; a static random access memory (SRAM) unit 730; a direct memory access (DMA) unit 732; and a display unit 740 for coupling to one or more external displays. The embodiments of the pages additions and content copying can be implemented in SoC 700.

Figure 8:
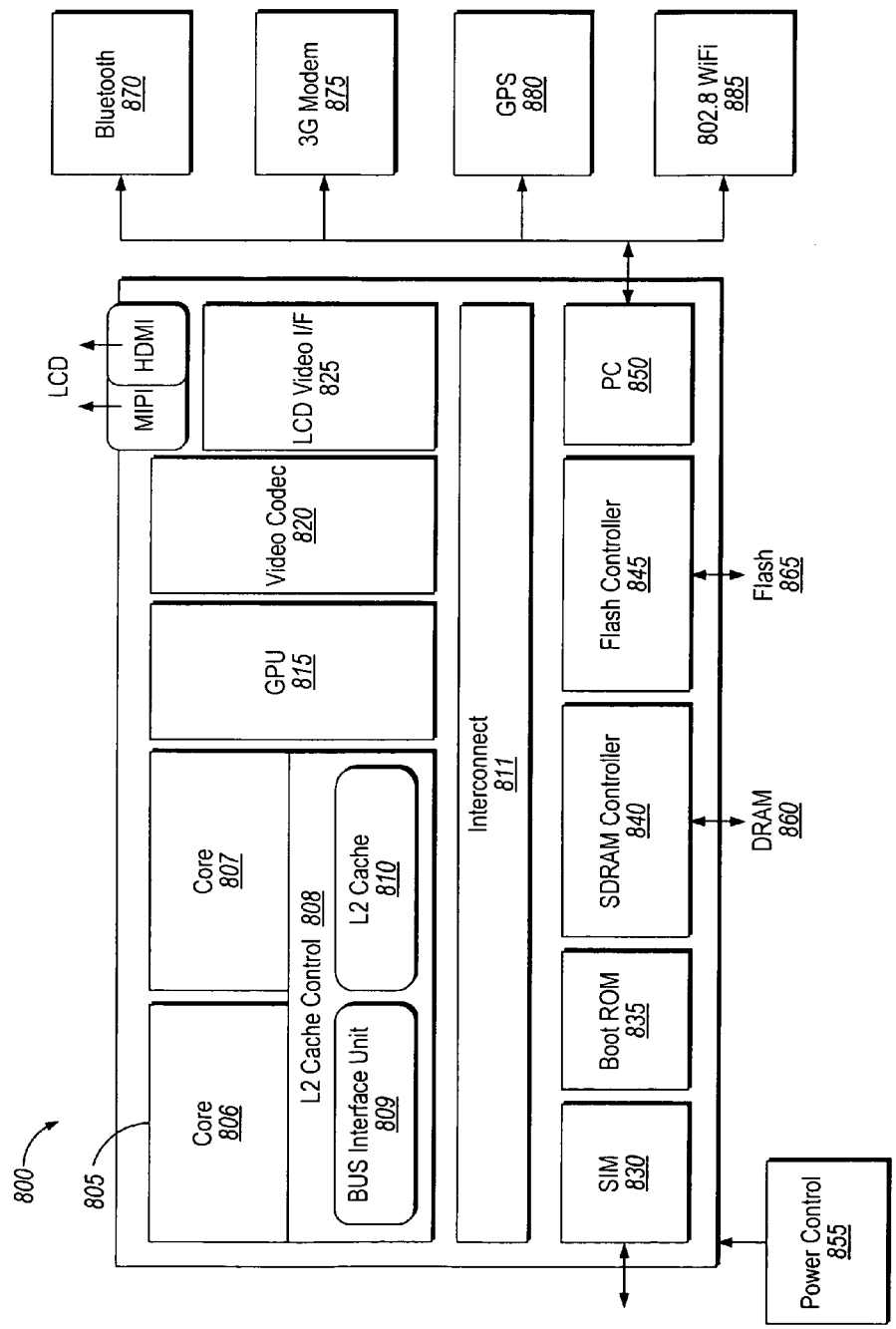
FIG. 8 illustrates another implementation of a block diagram for a computing system according to one implementation.

Turning next to FIG. 8, an embodiment of a system on-chip (SoC) design in accordance with embodiments of the disclosure is depicted. As an illustrative example, SoC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 800.

Here, SoC 800 includes 2 cores—806 and 807. Similar to the discussion above, cores 806 and 807 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 811 includes an on-chip interconnect, such as an IOSF, AMBA, or other interconnects discussed above, which can implement one or more aspects of the described disclosure.

Interconnect 811 provides communication channels to the other components, such as a Subscriber Identity Module (SIM) 830 to interface with a SIM card, a boot ROM 835 to hold boot code for execution by cores 806 and 807 to initialize and boot SoC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the embodiments described herein.

In addition, the system illustrates peripherals for communication, such as a Bluetooth module 870, 3G modem 875, GPS 880, and Wi-Fi 885. Note as stated above, a UE includes a radio for communication. As a result, these peripheral communication modules may not all be included. However, in a UE some form of a radio for external communication should be included.

Figure 9:
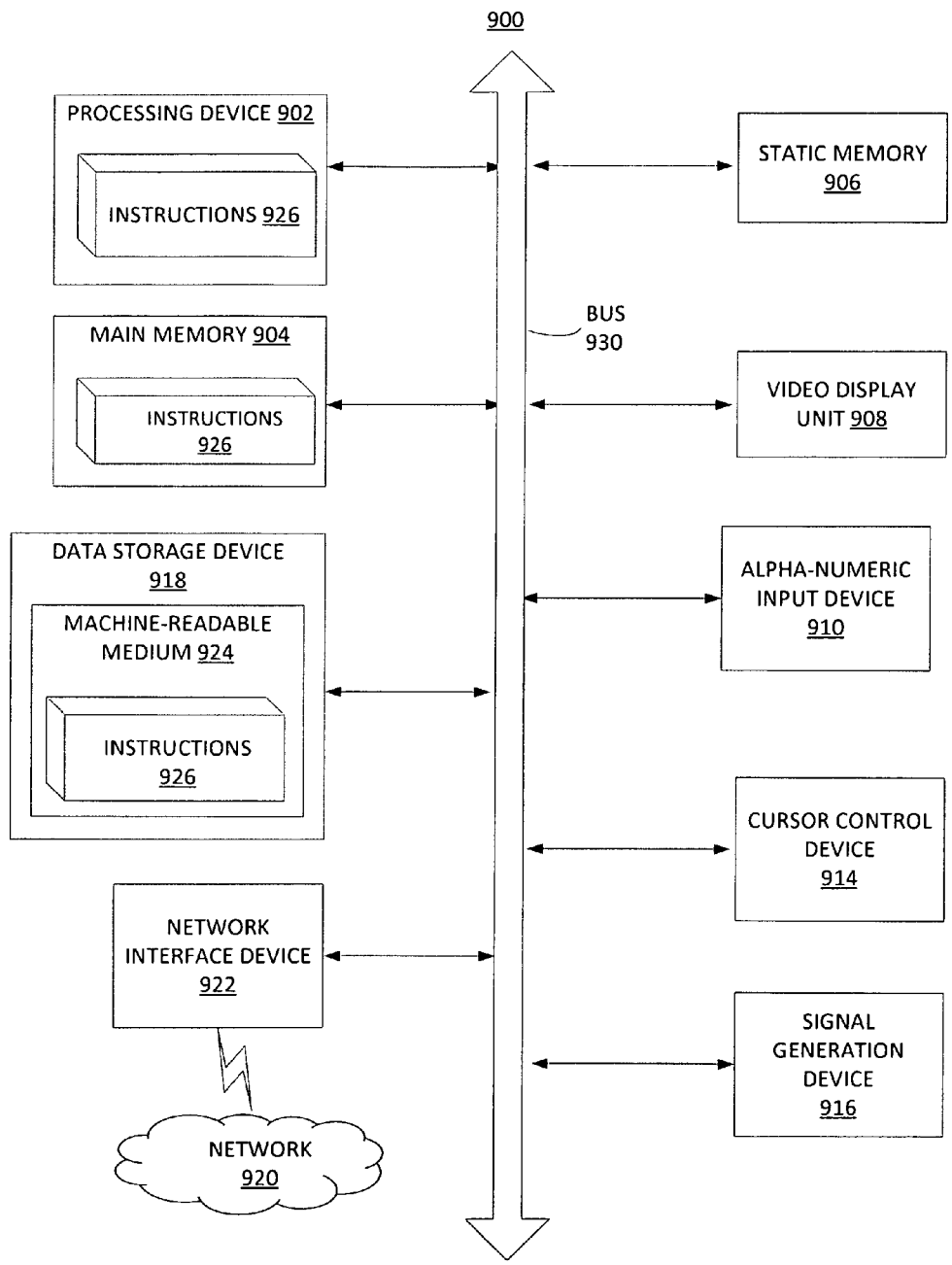
FIG. 9 illustrates another implementation of a block diagram for a computing system according to one implementation.

FIG. 9 illustrates a diagrammatic representation of a machine in the example form of a computing system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 900.

The computing system 900 includes a processing device 902, main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. In one embodiment, processing device 902 may include one or processor cores. The processing device 902 is configured to execute the processing logic 926 for performing the operations discussed herein. In one embodiment, processing device 902 can be part of a computing system. Alternatively, the computing system 900 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 900 may further include a network interface device 908 communicably coupled to a network 920. The computing system 900 also may include a video display unit 910 (e.g., a liquid crystal display (LCD) or a cathode ray tube (CRT)), an alphanumeric input device 910 (e.g., a keyboard), a cursor control device 914 (e.g., a mouse), a signal generation device 916 (e.g., a speaker), or other peripheral devices. Furthermore, computing system 900 may include a graphics processing unit 922, a video processing unit 928 and an audio processing unit 932. In another embodiment, the computing system 900 may include a chipset (not illustrated), which refers to a group of integrated circuits, or chips, that are designed to work with the processing device 902 and controls communications between the processing device 902 and external devices. For example, the chipset may be a set of chips on a motherboard that links the processing device 902 to very high-speed devices, such as main memory 904 and graphic controllers, as well as linking the processing device 902 to lower-speed peripheral buses of peripherals, such as USB, PCI or ISA buses.

The data storage device 918 may include a computer-readable storage medium 924 on which is stored software 926 embodying any one or more of the methodologies of functions described herein. The software 926 may also reside, completely or at least partially, within the main memory 904 as instructions 926 and/or within the processing device 902 as processing logic 926 during execution thereof by the computing system 900; the main memory 904 and the processing device 902 also constituting computer-readable storage media.

The computer-readable storage medium 924 may also be used to store instructions 926 utilizing the processing device 902, such as described with respect to FIG. 1, and/or a software library containing methods that call the above applications. While the computer-readable storage medium 924 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising: 1) a register, wherein the register is to store a first floating point (FP) value and a second FP value; and 2) a decoder to: a) receive a request from an application to perform an ADD low operation; and b) decode the request; 3) an ADD low functional unit to, in response the request: a) add the first FP value with the second FP value to obtain a first sum value; b) round the first sum value to generate an ADD value; c) add the first FP value with the second FP value to obtain a second sum value; and d) subtract the ADD value from the second sum value to generate an ADD low value.

In Example 2, the processor of Example 1, wherein: a) the first FP value comprises a first mantissa and a first exponent, and b) the second FP value comprises a second mantissa and a second exponent.

In Example 3, the processor of Example 2, wherein: a) to add the first FP value to the second FP to obtain the first sum value further comprises to add the first mantissa to the second mantissa to obtain a fourth mantissa for the first sum value; and b) to add the first FP value to the second FP to obtain the second sum value further comprises to add the first mantissa to the second mantissa to obtain a fifth mantissa for the second sum value.

In Example 4, the processor of Example 2, wherein the ADD low functional unit is further to shift one or more bits of the first mantissa or the second mantissa to align the first mantissa or the second mantissa to add to obtain the first sum value, to add to obtain the second sum value, or to subtract to generate the ADD low value.

In Example 5, the processor of Example 1, wherein the ADD low functional unit comprises: 1) an adder arithmetic-logic unit (ALU) to add to obtain the first sum value and to add to obtain the second sum value; 2) a rounder ALU to perform the rounding of the ADD value; and 3) a subtractor ALU to perform the subtraction of the ADD low value.

In Example 6, the processor of Example 1, wherein the ADD low functional unit comprises one or more floating-point units (FPU) to add to obtain the first sum value, to round to generate the ADD value, to add to obtain the second sum value, or to subtract to generate the ADD low value.

In Example 7, the processor of Example 1, wherein the ADD low functional unit is further to add to obtain the second sum value and to subtract to generate the ADD low value as a single instruction multiple data (SIMD) operation.

In Example 8, the processor of Example 1, wherein the ADD low functional unit is further to add to obtain the second sum value and to subtract to generate the ADD low value as a scalar computation.

In Example 9, the processor of Example 1, wherein the ADD low value is a single precision format value.

In Example 10, the processor of Example 1, wherein the ADD low value is a double precision format value.

In Example 11, the processor of Example 1, wherein the ADD low functional unit is further to: a) normalize the ADD low value to obtain a normalized ADD low value; and b) round the normalized ADD low value to obtain a rounded ADD low value.

Various embodiments may have different combinations of the structural features described above. For instance, all optional features of the processors and methods described above may also be implemented with respect to a system described herein and specifics in the examples may be used anywhere in one or more embodiments.

Example 12 is a method comprising: 1) adding, by an ADD low functional unit, a first floating point (FP) value to a second FP value to obtain a first sum value; 2) rounding, by the ADD low functional unit, the first sum value to generate an ADD value; 3) adding, by the ADD low functional unit, the first FP value to the second FP value to obtain a second sum value; and 3) subtracting, by the ADD low functional unit, the ADD value from the second sum value to generate an ADD low value.

In Example 13, the Example of claim 12, wherein the ADD value is a first portion of a bit string and the ADD low value is a second portion of the bit string.

In Example 14, the Example of claim 12, further comprising limiting a number of tail bits used in generating the ADD low value.

In Example 15, the Example of claim 12, further comprising: normalizing, by the ADD low functional unit, the ADD low value to obtain a normalized ADD low value; and rounding, by the ADD low functional unit, the normalized ADD low value to obtain a rounded ADD low value.

In Example 16, the Example of claim 15, wherein the first sum value and the normalized ADD low value are rounded using a round-to-nearest integer algorithm or a round towards zero algorithm.

Various embodiments may have different combinations of the structural features described above. For instance, all optional features of the processors and methods described above may also be implemented with respect to a system described herein and specifics in the examples may be used anywhere in one or more embodiments.

Example 17 is a processor comprising: 1) a register, wherein the register is to store a first floating point (FP) value and a second FP value; and 2) an ADD low functional unit to receive a request from an application to perform an ADD low operation and perform the following in response to the request: a) add the first FP value with the second FP value to obtain a first sum value; b) round the first sum value to generate an ADD value; c) add the first FP value with the second FP value to obtain a second sum value; d) subtract the ADD value from the second sum value to generate a difference value; e) normalize the difference value to obtain a normalized difference value; f) round the normalized difference value to generate an ADD low value; and g) send the ADD low value to the application.

In Example 18, the processor of Example 17, wherein: a) the first FP value comprises a first mantissa and a first exponent, b) the second FP value comprises a second mantissa and a second exponent, and c) the ADD low functional unit is further to shift one or more bits of the first mantissa or the second mantissa to add to obtain the first sum value, to add to obtain the second sum value, or to subtract to generate the difference value.

In Example 19, the processor of Example 18, wherein the ADD low functional unit is further to determine the one or more bits in a bit string to shift using an encoder.

In Example 20, the processor of Example 17, wherein the ADD low functional unit comprises one or more arithmetic-logic units (ALU) to add to obtain the first sum value, to round to generate the ADD value, to add to obtain the second sum value, to subtract to generate the difference value, to normalize to obtain the normalized difference value, or to round to generate the ADD low value.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to floating point (FP) add low operations in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a register, wherein the register is to store a first floating point (FP) value and a second FP value; and
   a decoder to:
      receive a request from an application to perform an ADD low operation; and
      decode the request; and
   an ADD low functional circuit coupled to the register and is to, in response the request:
      add the first FP value with the second FP value to obtain a first sum value;
      round the first sum value to generate an ADD value;
      add the first FP value with the second FP value to obtain a second sum value; and
      subtract the ADD value from the second sum value to generate an ADD low value.

2. The processor of claim 1, wherein:
   the first FP value comprises a first mantissa and a first exponent, and
   the second FP value comprises a second mantissa and a second exponent.

3. The processor of claim 2, wherein:
   to add the first FP value to the second FP to obtain the first sum value further comprises to add the first mantissa to the second mantissa to obtain a third mantissa for the first sum value; and
   to add the first FP value to the second FP to obtain the second sum value further comprises to add the first mantissa to the second mantissa to obtain a fourth mantissa for the second sum value.

4. The processor of claim 2, wherein the ADD low functional circuit is further to shift one or more bits of the first mantissa or the second mantissa to align the first mantissa or the second mantissa to add to obtain the first sum value, to add to obtain the second sum value, or to subtract to generate the ADD low value.

5. The processor of claim 1, wherein the ADD low functional circuit comprises:
   an adder arithmetic-logic unit (ALU) to add to obtain the first sum value and to add to obtain the second sum value;
   a rounder ALU to perform the rounding of the ADD value; and
   a subtractor ALU to perform the subtraction of the ADD low value.

6. The processor of claim 1, wherein the ADD low functional circuit comprises one or more floating-point units (FPU) to add to obtain the first sum value, to round to generate the ADD value, to add to obtain the second sum value, or to subtract to generate the ADD low value.

7. The processor of claim 1, wherein the ADD low functional circuit is further to add to obtain the second sum value and to subtract to generate the ADD low value as a single instruction multiple data (SIMD) operation.

8. The processor of claim 1, wherein the ADD low functional circuit is further to add to obtain the second sum value and to subtract to generate the ADD low value as a scalar computation.

9. The processor of claim 1, wherein the ADD low value is a single precision format value.

10. The processor of claim 1, wherein the ADD low value is a double precision format value.

11. The processor of claim 1, wherein the ADD low functional circuit is further to:
normalize the ADD low value to obtain a normalized ADD low value; and
round the normalized ADD low value to obtain a rounded ADD low value.

12. A method comprising:
adding, by an ADD low functional circuit, a first floating point (FP) value to a second FP value to obtain a first sum value;
rounding, by the ADD low functional circuit, the first sum value to generate an ADD value;
adding, by the ADD low functional circuit, the first FP value to the second FP value to obtain a second sum value; and
subtracting, by the ADD low functional circuit, the ADD value from the second sum value to generate an ADD low value.

13. The method of claim 12, wherein the ADD value is a first portion of a bit string and the ADD low value is a second portion of the bit string.

14. The method of claim 12, further comprising limiting a number of tail bits used in generating the ADD low value.

15. The method of claim 12, further comprising:
normalizing, by the ADD low functional circuit, the ADD low value to obtain a normalized ADD low value; and
rounding, by the ADD low functional circuit, the normalized ADD low value to obtain a rounded ADD low value.

16. The method of claim 15, wherein the first sum value and the normalized ADD low value are rounded using a round-to-nearest integer algorithm or a round towards zero algorithm.

17. A processor comprising:
a register, wherein the register is to store a first floating point (FP) value and a second FP value; and
an ADD low functional circuit coupled to the register and is to receive a request from an application to perform an ADD low operation and perform the following in response to the request:
add the first FP value with the second FP value to obtain a first sum value;
round the first sum value to generate an ADD value;
add the first FP value with the second FP value to obtain a second sum value;
subtract the ADD value from the second sum value to generate a difference value;
normalize the difference value to obtain a normalized difference value;
round the normalized difference value to generate an ADD low value; and
send the ADD low value to the application.

18. The processor of claim 17, wherein:
the first FP value comprises a first mantissa and a first exponent,
the second FP value comprises a second mantissa and a second exponent, and
the ADD low functional circuit is further to shift one or more bits of the first mantissa or the second mantissa to add to obtain the first sum value, to add to obtain the second sum value, or to subtract to generate the difference value.

19. The processor of claim 18, wherein the ADD low functional circuit is further to determine the one or more bits in a bit string to shift using an encoder.

20. The processor of claim 17, wherein the ADD low functional circuit comprises one or more arithmetic-logic units (ALU) to add to obtain the first sum value, to round to generate the ADD value, to add to obtain the second sum value, to subtract to generate the difference value, to normalize to obtain the normalized difference value, or to round to generate the ADD low value.

* * * * *